United States Patent Office 2,967,942
Patented Jan. 10, 1961

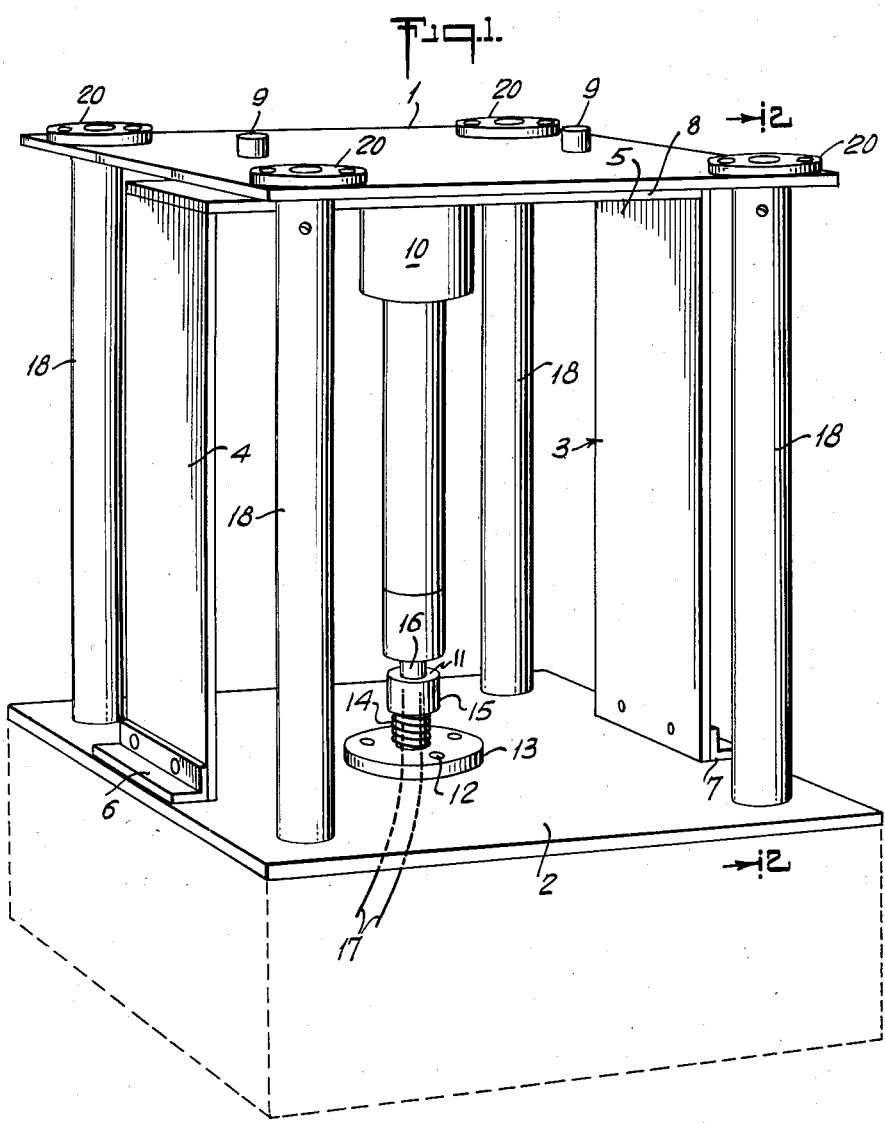

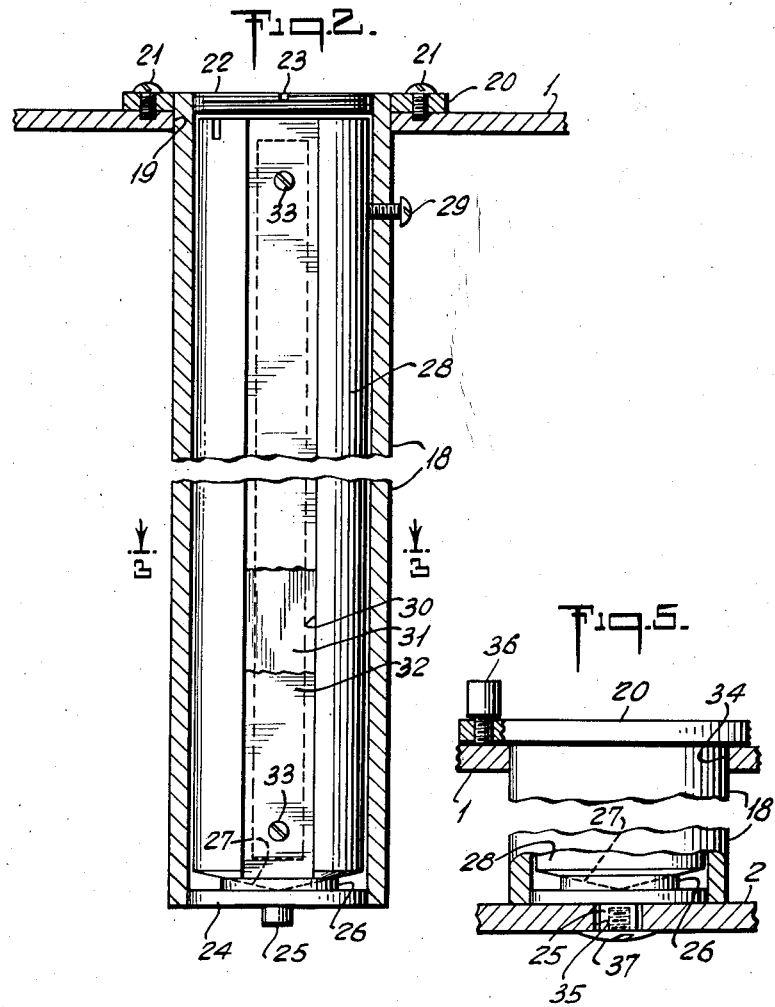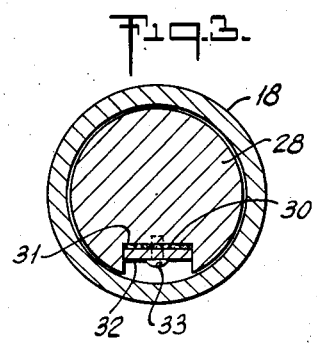

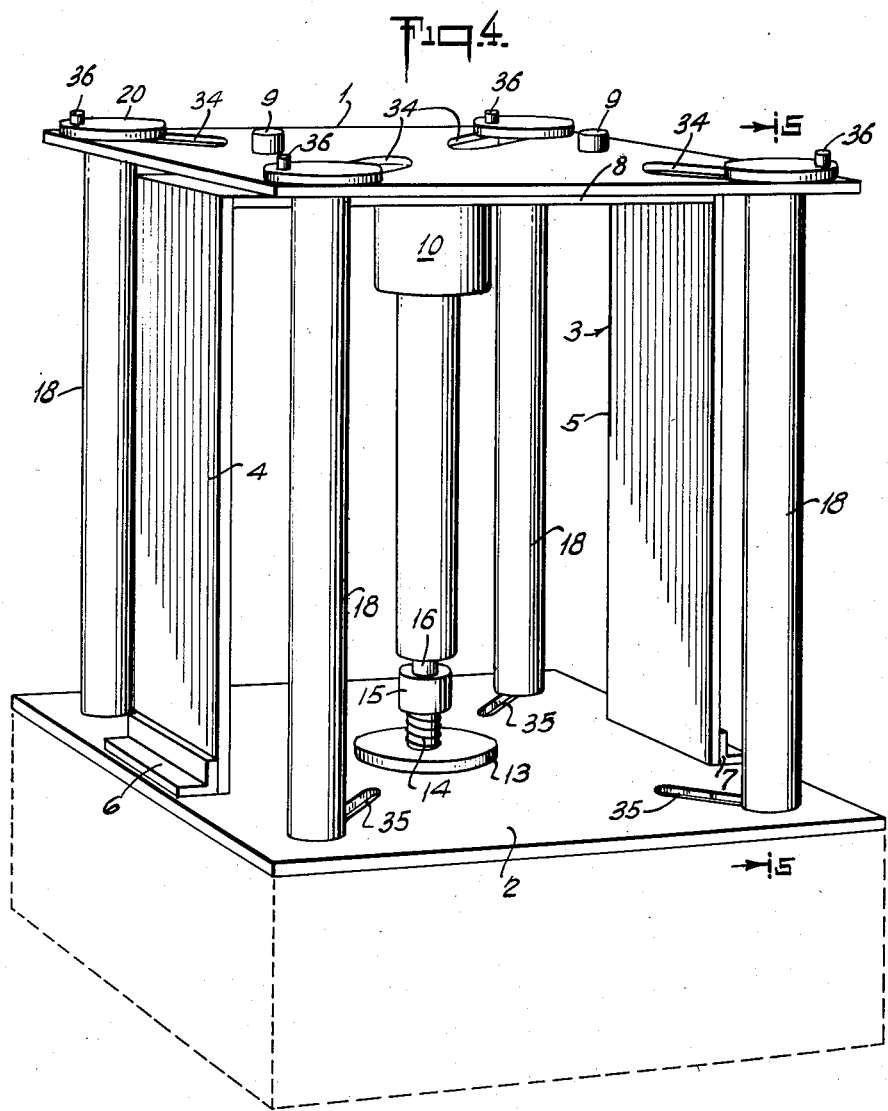

2,967,942

APPARATUS FOR TESTING RADIATION DETECTION DEVICES

George E. Davis, 345 Clinton Ave., Brooklyn 38, N.Y., and Elmo J. Di Ianni, 247 Schenck Blvd., Floral Park, N.Y.

Filed June 2, 1959, Ser. No. 817,697

11 Claims. (Cl. 250—83.6)

(Granted under Title 35, U.S. Code (1952), sec. 266)

The invention described herein may be manufactured and used by or for the Government of the United States of America for governmental purposes without the payment of any royalties thereon or therefor.

This invention relates in general to the evaluation of Geiger-Müller tube characteristics with respect to radioactive radiation, and more particularly to the design of an excitation unit for the evaluation of the gamma response and sensitivity of various G-M tubes (Geiger-Müller).

In the evaluation of G-M tubes, it is necessary to provide, whenever possible, a uniform gamma radiation field along the vertical axis of the counter tube in order that the measurements be repeatable, that tubes of various lengths be adaptable to similar measurements and comparison and that the fringe effects of the radiation field be minimized. Moreover, the accuracy of the measurements can be increased and tubes of different sensitivities measured if the intensity of the radiation field is also controllable and the tube being measured is accurately centered.

Heretofore, these measurements were accomplished by introducing the tube into the center of a radiation field emanating from a series of individual radioactive rings stacked one above the other, but spaced a considerable vertical distance above one another. The position of the foils with respect to the tube under test, and the amount of shielding interposed between the foils and the tube, are rigidly fixed. Therefore, no variation in field strength can be obtained, once the unit is assembled. Since the radium concentrations in the foils vary, the field strengths differ from measurement unit to measurement unit. Because of this, there is a lack of agreement between measurements made by different laboratories. Where the deviation between measurements is small, a correction factor can be determined, to bring differing measurements into agreement. In other instances, where the lack of agreement is more pronounced, it is necessary to adjust the radioactive field thereby necessitating disassembly of the unit and either physically trimming the edges of the radioactive foils (where a reduction in field strength is required) or adding bits of radioactive foil (when an increase in field strength is required). This is, at best, a long and tedious procedure, and adjustment of the field cannot be effected with sufficient precision to eliminate the need for correction factors. Moreover, the correction factors do not apply under all conditions, since variations in tube design or in the equipment used in conjunction with the excitation unit result in changes in recorded tube response and invalidate the assigned correction factors, necessitating the determination of new values. This arrangement also, however, subjects the tube to a non-uniform field along its vertical axis and does not permit adjustment for the field intensity. Other disadvantages of this arrangement become readily apparent when one considers that comparisons cannot be made for tubes of different sizes since the discontinuity of the field is a function of the tube length. In addition, the tube cannot be accurately centered due in part to the immobility of the individual rings, no provision is made for shielding the source or minimizing any end effects.

An object of this invention is to provide a simple, practical, convenient and uniform gamma radiation field of variable and controllable intensity for the evaluation of G-M tubes.

Another object is to provide a vertically uniform gamma radiation field for the evaluation and comparison of G-M tube characteristics where the tubes vary in size. A further object of this invention is to provide, in addition to the above-mentioned features and objects, a means for centering the G-M tube in the radiation field and means for attenuating undesired radiation which would otherwise impinge upon the tube.

Other objects and advantages will be apparent from the following description of some embodiments of the invention and the novel features thereof will be particularly pointed out hereinafter in connection with the appended claims.

In the accompanying drawings:

Fig. 1 is a perspective of one embodiment made in accordance with this invention;

Fig. 2 is a longitudinal sectional elevation approximately along the line 2—2 of Fig. 1;

Fig. 3 is a cross-section plan of the device, the section being taken approximately along the line 3—3 of Fig. 2;

Fig. 4 is a perspective of another embodiment made in accordance with this invention; and Fig. 5 is a longitudinal sectional elevation approximately along the line 5—5 of Fig. 4.

The embodiment of the invention illustrated in Fig. 1, comprises a square plate member 1 and a square base member 2 superposed in a face to face, spaced relation and supported in such spaced relationship by a U-shaped support member 3. The sides or arms 4 and 5 of the support member 3 are perpendicular to and attached to the base member 2 through right angle members 6 and 7. The base 8 of the U-shaped support member 3 extends between said arms along and is detachably coupled to the under face of the plate member 1 by screws 9. The support member 3 carries a depending tube receiving sleeve 10 of well known construction, which is detachably secured to the lower face of the cross member in centered position, with respect to opposite edges of the plate. A lower tube mounting 11 which is also of a well known structural design, is affixed at the center of the base 2 by screws 12 passing through a flange 13 of the tube mounting and into the base. The mounting 11 is adjustable in height by means of a coil spring 14 which yieldingly urges a sleeve 15 upwardly to receive the lower end of the tube and securely and replaceably holds tubes of various lengths when they are disposed perpendicularly between the base and plate. The spring forces the sleeve 15 of the lower tube mounting upwardly to tightly abut and confine the tube cap 16 at the lower end of the tube and maintain the tube within the upper tube mounting, thereby accurately centering the tube and supporting it in a perpendicular position with respect to both the base and plate. Wire conductors 17 pass through the base and terminate in connections of usual construction to the tube cap or socket and are connected at their other ends to associated electronic assemblies employed to evaluate the tube characteristics and to supply activating energy for the tube.

Four brass sleeves or hollow columns 18, whose axes are parallel to the tube and perpendicular to the base and plate, are interposed between the base and plate adjacent the corners of the base and plate. Each sleeve extends upwardly through and fits an aperture 19 in the plate 1 (see Fig. 2). The upper end portion of the sleeve which extends past the upper surface of the plate carries a peripheral flange 20 fixed thereto which overlies the upper face of plate and is secured to the plate by screws 21. A capping retainer ring 22 is threaded into the upper end of the sleeve 18 to close it. It has a slot 23 in its upper face to receive a tool by which it can be threaded into or out of the sleeve. The lower portion of the sleeve is closed by and receives and holds an end member 24. The lower face of the end member 24 lies in the same plane with the lower edges of the sleeve 18, except for a central cylindrical positioning guide extension 25 which is complementary to and tightly fits into a hole in the base to correctly position and hold the sleeve securely between the base and the plate. A centrally disposed raised portion 26 on the upper surface of the lower end member 24 has in its upper face a central circular recess 27 with an upwardly divergent side wall. A metal generally cylindrical rod 28, usually of brass, is disposed in, nearly fills and is free to rotate within the passage within the sleeve 18. The lower end face of the rod 28 is convergingly tapered in a direction away from the rod and is complementary to the tapered recess 27 in the upper surface of the end member 24 thereby centering and rotatably mounting the rod 28. The upper end face of the rod is notched to receive a tool such as the tip of a screwdriver when the cap 22 is removed in order that the rod 28 may be rotatably adjusted about its longitudinal axis.

A set screw 29 adjustably threadable through sleeve 18 engages the rod 28 to secure it in adjusted position. The rod 28 has a channel 30 in its wall extending approximately for the full length of the rod and having its bottom wall normal to a radius to the axis of rotation of the rod. Disposed in this channel are two members; the first, a radium-impregnated foil 31 which abuts and lines the bottom of the channel. The second member 32 overlies foil 31 and serves as a retainer to confine the foil in the channel. The member 32 is detachably secured in the channel 30 in any suitable manner such as by screws 33. The foil may be of a length comparable to the retainer or shorter since it will be held in the channel by the retainer.

It will be noted that this device provides positive positioning of the counter tube to be evaluated and a uniform gamma radiation field which is uniform along the vertical axis of the counter tube to be evaluated. If the foils in the different rods are not equally impregnated with the radium, individual adjustments of the foil-carrying rods can be made by individually rotating the rods. The radium impregnated foils emit both gamma and beta radiation and since the gamma tube characteristics should be determined with a minimum or known beta radiation, shielding of the tube from this high energy beta radiation is essential. To this end, the metal or brass wall of the sleeve 18 serves to shield, by way of absorption, the tube from high energy beta radiation. For instance, with ⅛ inch brass walls, complete filtration of the 3.15 mev. betas is accomplished. Mathematical computations may readily be made to determine the wall thickness for various metals in order to filter betas exceeding any predetermined high energy.

Turning now to the operation of the excitation device illustrated in Fig. 1, wherein the counter tube to be evaluated is mounted centrally between the base and the plate, and the four sleeve columns containing the radiation sources are equidistant from the tube, a small thimble chamber probe or a Victoreen "R" meter samples the field strength in the vicinity of the counter tube, either with the tube in position or removed. During this sampling, the rods 28 are individually rotated about their longitudinal axes relative to the probe by inserting a blade or screwdriver into the transverse recess (slot) at the upper end of the rod until the desired uniformity of field strength at the tube position, is attained by interposing more or less brass or metal of the rod and sleeve wall between the source in the channels and the probe or tube. After the proper field strength is attained, each rod is secured in position by means of the set screw located in the wall of each sleeve.

An alternate manner of properly setting the field strength is to start with only one sleeve in position (others removed or foils removed) and to adjust the field strength at the tube (now mounted) by rotation of the rod until ¼ of the final desired field strength is indicated by the counter tube, then a second sleeve or foil is inserted in the unit and the second rod therein rotated until the field strength indicated by the tube is ½ the final desired field strength, and continuing similarly with the other sleeves and rods until all four of the rods have been adjusted and locked in position.

It should be noted that where the radium concentrations in the foils vary in density from one another, the field strength adjustment to obtain a uniform field may still be made with this device as outlined above and by a similar procedure. Since the foils extend vertically past the ends of the counter tube, end or fringe effects are thereby minimized.

Another embodiment of this invention is illustrated in Fig. 4, wherein portions of the plate 1 are removed to form slots 34 extending toward the tube to be evaluated, and of a width to tightly receive the upper end of the sleeve or column 18 and yet permit the free movement of each sleeve individually toward and from the tube. Similarly directed slots 35 are provided in the base to receive the positioning guide extensions 25, thereby allowing bodily translation movement of each individual sleeve column relative to the tube while the sleeve axes remain parallel to the tube axis. The sleeves 18 may be individually secured in any such positions relative to the tube into which they are moved by means of set screws 36 threaded through the flanges 20 and engaging against the top of plate 1, and also by having (Fig. 5) screws 37 whose heads abut against the under face of the base 2 and whose shanks are threaded with the end faces of the guide extensions 25. When screws 36 and 37 are tightened they clamp the sleeves 18 individually in adjusted positions toward and from the tube. This last described embodiment exhibits all the desirable features of the first described embodiment, and in addition permits a greater overall variation in field strength available at the tube to be evaluated, thereby facilitating repeatable measurements of tubes requiring high and low field strengths without changing the radium impregnated foils.

It will be understood that various changes in the details, materials and arrangements of parts, which have been herein described and illustrated in order to explain the nature of this invention, may be made by those skilled in the art within the principle and scope of the invention, as expressed in the appended claims.

We claim:

1. An excitation device for use in evaluating a radiation detection unit, which comprises a support for detachably mounting said detection unit to be evaluated, a plurality of metallic members arranged in a row around said detection unit, extending approximately parallel to said unit, and mounted on said support for individual rotation about axes parallel to the axis of said unit, and means for securing said members in any desired position, each member carrying a band of radiation source that extends in a direction lengthwise of and is parallel and eccentric to the axis of rotation of that member, metallic means disposed between said member and said unit for blocking out an undesired type of radiation, whereby when said unit to be evaluated is mounted on said support, said members may be individually rotated to vary the intensity of radiation reaching said unit from each of a plurality of different directions until a uniform strength of field is provided upon said unit on all sides thereof, to enable evaluation of the detection unit.

2. The device as set forth in claim 1 wherein said metallic members are carried by said support for individual bodily movement toward and from said detection unit.

3. The device as set forth in claim 2 wherein said metallic means is a sleeve surrounding said metallic member and relative to which said source is rotatable.

4. The device as set forth in claim 3 wherein said metallic member is a solid cylindrical rod having a longitudinally extending channel in its wall and detachably secured in said channel with said band of radiation source, with the face of said band perpendicular to the radius of said cylindrical rod.

5. The device as set forth in claim 1 wherein said metallic members are solid cylindrical rods having therein a longitudinally extending chamber disposed eccentric to the axis of rotation of said metallic member, and a radiation source disposed within and extending for the full length of said chamber.

6. An excitation device for use in evaluating a radiation detection unit, which comprises a base and a plate superposed in face to face spaced relation, means attaching said base and plate to one another in said spaced relation and detachably supporting said plate thereon, means carried partly by said attaching means and said base formed to detachably mount said unit longitudinally between said base and said plate, a plurality of metallic sleeves arranged symmetrically around said unit, extending approximately parallel to said unit between said base and said plate and detachably mounted on said base and on said plate, said plate having apertures from face to face therethrough aligned with the passage of said sleeves, a solid metallic cylindrical rod substantially filling and rotatable in each said sleeve and having in a side thereof a longitudinally extending channel with a foil of radioactive material detachably secured in the channel, means for securing said rods in any desired angular position of rotation, means for detachably capping said plate apertures, whereby when said detection unit to be evaluated is mounted between said attaching means and said base, said rods may be individually rotated to accurately vary the intensity of radiation reaching said unit from each of a plurality of different directions until a uniform strength of field is provided upon said unit on all sides thereof, to enable evaluation of said detection unit.

7. The device as set forth in claim 6 wherein said metallic sleeves extend through said apertures in said plate and terminating in peripheral flanges abutting the upper face of said plate, means detachably securing said flanges to said plate.

8. A device as set forth in claim 7 wherein each of said rods has its upper end formed to receive a tool by which it may be rotated within said sleeve, and means for releasably locking each rod in any angular position into which it may be rotated.

9. A device as set forth in claim 8 wherein said attaching means is a U-shaped member, with the free ends of the sides of said U-shaped member secured to said base, and the upper cross member having its upper face abutting and detachably secured to the lower face of said plate and extending at least to opposite edges of said plate, part of said means for mounting said unit being interposed between said arms, centrally disposed with respect to said plate and said base, and secured to the lower face of said cross member.

10. A device as set forth in claim 9 wherein said foil radiation source is of the type emitting primarily gamma radiation and has its face perpendicular to the radius of said rod, and means for applying electrical energy to and detecting electrical energy from said unit which may be applied to external electrical circuitry.

11. A device according to claim 10 wherein said sleeves are mounted between said plate and base for individual bodily adjustment toward and away from said unit.

References Cited in the file of this patent

UNITED STATES PATENTS

| | | |
|---|---|---|
| 2,761,071 | Hurst | Aug. 28, 1956 |
| 2,820,905 | Schloss | Jan. 21, 1958 |